US012412988B2

(12) United States Patent
Sudo

(10) Patent No.: US 12,412,988 B2
(45) Date of Patent: Sep. 9, 2025

(54) ANTENNA MODULE AND COMMUNICATION DEVICE MOUNTED WITH SAME

(71) Applicant: Murata Manufacturing Co., Ltd., Nagaokakyo (JP)

(72) Inventor: Kaoru Sudo, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 81 days.

(21) Appl. No.: 18/581,392

(22) Filed: Feb. 20, 2024

(65) Prior Publication Data

US 2024/0195075 A1 Jun. 13, 2024

Related U.S. Application Data

(63) Continuation of application No. PCT/JP2022/029278, filed on Jul. 29, 2022.

(30) Foreign Application Priority Data

Sep. 22, 2021 (JP) ................................ 2021-154353

(51) Int. Cl.
*H01Q 13/08* (2006.01)
*H01Q 1/40* (2006.01)
*H01Q 21/28* (2006.01)

(52) U.S. Cl.
CPC ............... *H01Q 13/08* (2013.01); *H01Q 1/40* (2013.01); *H01Q 21/28* (2013.01)

(58) Field of Classification Search
CPC ........... H01Q 13/08; H01Q 1/40; H01Q 21/28
See application file for complete search history.

(56) References Cited

U.S. PATENT DOCUMENTS 10,784,593 B1 * 9/2020 Sims, III ................ H01Q 21/30
2014/0375502 A1 12/2014 Foo
2019/0207323 A1 7/2019 Joung et al.

FOREIGN PATENT DOCUMENTS

JP 2003-198230 A 7/2003
JP 2005-198335 A 7/2005
WO 2020/066453 A1 4/2020
WO 2020/149138 A1 7/2020

OTHER PUBLICATIONS

International Search Report and Written Opinion mailed on Oct. 18, 2022, received for PCT Application PCT/JP2022/029278, filed on Jul. 29, 2022, 8 pages including English Translation.

* cited by examiner

*Primary Examiner* — Henry Luong
(74) *Attorney, Agent, or Firm* — XSENSUS LLP

(57) ABSTRACT

An antenna module includes a dielectric substrate that has an upper surface and a lower surface; radiating elements that have a flat-plate shape; and dielectric layers. The radiating elements are arranged in the dielectric substrate and can radiate respective radio waves in mutually-different frequency bands. The dielectric layer is arranged in a manner to cover a first region in which the radiating element is arranged. The dielectric layer is arranged in a manner to cover a second region in which the radiating element is arranged. Dielectric constants of the dielectric layers are higher than a dielectric constant of the dielectric substrate. The first region and the second region are adjacent to each other. The radiating element overlaps with the radiating element or the radiating element in plan view in a normal direction of the dielectric.

20 Claims, 11 Drawing Sheets

ANTENNA MODULE AND COMMUNICATION DEVICE MOUNTED WITH SAME

CROSS-REFERENCE TO RELATED APPLICATIONS

This is a continuation application of PCT/JP2022/029278, filed on Jul. 29, 2022, designating the United States of America, which is based on and claims priority to Japanese Patent Application No. JP 2021-154353 filed on Sep. 22, 2021. The entire contents of the above-identified applications, including the specifications, drawings and claims, are incorporated herein by reference in their entirety.

TECHNICAL FIELD

The present disclosure relates to an antenna module and a communication device mounted with the same, and more specifically relates to a technique for realizing broadband in antenna characteristics.

BACKGROUND ART

Japanese Unexamined Patent Application Publication No. 2003-198230 (Patent Document 1) discloses the configuration for improving antenna characteristics by using dielectrics, whose thickness differ depending on corresponding frequencies, for respective antenna portions in an antenna in which a plurality of antenna portions corresponding to mutually-different respective frequency bands are arranged on the same substrate.

International Publication No. 2020/066453 (Patent Document 2) discloses the configuration in which an upper portion of a dielectric member, which is arranged on a patch antenna, is sealed with sealing resin in an antenna device including the patch antenna having a flat-plate shape.

U.S. patent Ser. No. 10/784,593 (Patent Document 3) discloses the configuration in which two dielectric layers are arranged on a patch antenna on a lower frequency side and one dielectric layer is arranged on a patch antenna on a higher frequency side in a dual-band type patch antenna.

CITATION LIST

Patent Documents

Patent Document 1: Japanese Unexamined Patent Application Publication No. 2003-198230
Patent Document 2: International Publication No. 2020/066453
Patent Document 3: U.S. patent Ser. No. 10/784,593

SUMMARY OF DISCLOSURE

Technical Problem

In recent years, development of communication devices compatible with a plurality of communication standards has been progressing. Such communication devices are required to transmit and receive radio waves in mutually-different frequency bands defined by respective communication standards, and antennas corresponding to three or more frequency bands are sometimes arranged on the same dielectric substrate. A wide frequency bandwidth is desired for each of the frequency bands.

In general, parameters suitable for antenna characteristics (such as a dielectric constant) differ depending on a target frequency band. In the configuration in which antennas corresponding to three or more mutually-different frequency bands are arranged on the same substrate as described above, it may be impossible to optimize parameters for all of the antennas.

The present disclosure has been made to solve the above-mentioned problems and an object of the present disclosure is to realize broadband in antenna characteristics of each radiating element in an antenna module in which radiating elements corresponding to three or more mutually-different frequency bands are arranged.

Solution to Problem

An antenna module according to a first aspect of the present disclosure includes a dielectric substrate that has a first surface and a second surface, first to third radiating elements that have a flat-plate shape, a first dielectric layer, and a second dielectric layer. The first to third radiating elements are arranged in the dielectric substrate and can radiate respective radio waves in mutually-different frequency bands. The first dielectric layer is arranged on the first surface of the dielectric substrate in a manner to cover a first region in which the first radiating element is arranged. The second dielectric layer is arranged on the first surface of the dielectric substrate in a manner to cover a second region in which the third radiating element is arranged. A dielectric constant of the first dielectric layer and a dielectric constant of the second dielectric layer are higher than a dielectric constant of the dielectric substrate. The first region and the second region are adjacent to each other. The first radiating element can radiate a radio wave in a first frequency band. The second radiating element can radiate a radio wave in a second frequency band that is higher than the first frequency band. The third radiating element can radiate a radio wave in a third frequency band that is higher than the second frequency band. The second radiating element overlaps with the first radiating element or the third radiating element in plan view in a normal direction of the dielectric substrate.

An antenna module according to a second aspect of the present disclosure includes a dielectric substrate that has a first surface and a second surface, first to third radiating elements that are arranged in the dielectric substrate, a first dielectric layer, and a second dielectric layer. Each of the first to third radiating elements includes a plurality of electrodes having a flat-plate shape. The first dielectric layer is arranged on the first surface of the dielectric substrate in a manner to cover a first region in which the electrodes of the first radiating element are arranged. The second dielectric layer is arranged on the first surface of the dielectric substrate in a manner to cover a second region in which the electrodes of the third radiating element are arranged. The first to third radiating elements can radiate radio waves in mutually-different frequency bands. A dielectric constant of the first dielectric layer and a dielectric constant of the second dielectric layer are higher than a dielectric constant of the dielectric substrate. The first region and the second region are adjacent to each other. The first radiating element can radiate a radio wave in a first frequency band. The second radiating element can radiate a radio wave in a second frequency band that is higher than the first frequency band. The third radiating element can radiate a radio wave in a third frequency band that is higher than the second frequency band. The electrodes of the second radiating element overlap with the electrodes of the third radiating element in plan view in a normal direction of the dielectric substrate.

Advantageous Effects of Disclosure

In the antenna module according to the present disclosure, three types of radiating elements, which can radiate respective radio waves in mutually-different frequency bands, are provided in the same dielectric substrate, and each of two radiating elements of the three are arranged in the first region and the second region that are adjacent to each other. The rest of the radiating elements forms a stack structure with one of the other radiating elements, and mutually-different respective dielectric layers are arranged to cover the first region and the second region. In such a configuration, by individually setting the dielectric layers suitable for the radiating element arranged in the first region and the radiating element arranged in the second region, broadband in antenna characteristics of each radiating element can be realized.

DESCRIPTION OF EMBODIMENTS

Figure 1:
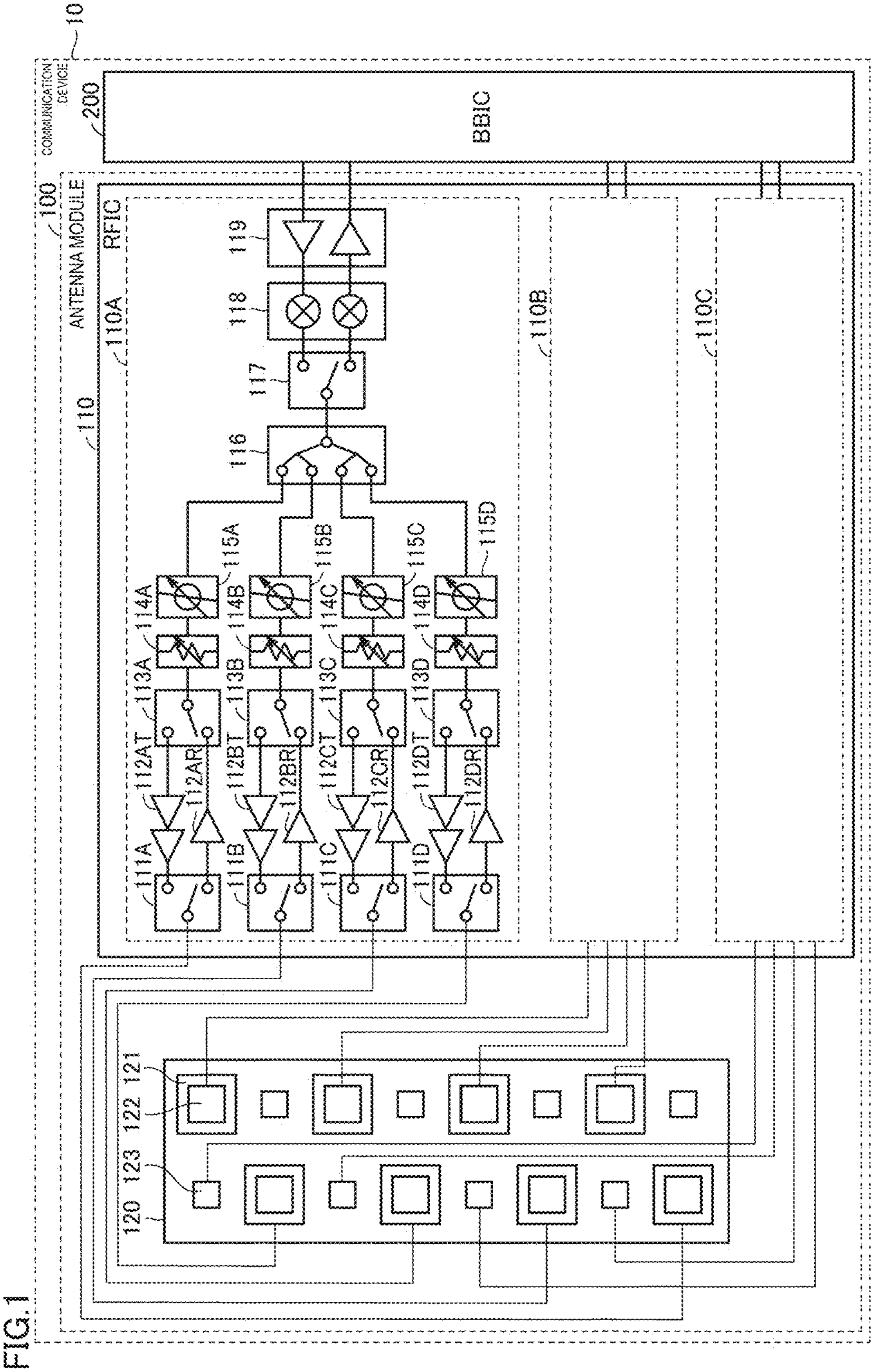
FIG. 1 is a block diagram of a communication device to which an antenna module according to a first embodiment is applied.

Embodiments according to the present disclosure will be described in detail below with reference to the accompanying drawings. Here, the same reference characters are given to the same or corresponding portions and the description thereof will not be repeated.

First Embodiment (Basic Configuration of Communication Device)

FIG. 1 is an example of a block diagram of a communication device 10 to which an antenna module 100 according to this first embodiment is applied. The communication device 10 is, for example, a portable terminal such as a cellular phone, a smartphone, and a tablet, or a personal computer with a communication function. An example of a frequency band of a radio wave used for the antenna module 100 according to the present embodiment is a millimeter wave band with a center frequency of 28 GHz, 39 GHz, or 60 GHz, for example, but radio waves in frequency bands other than the above are also applicable.

Referring to FIG. 1, the communication device 10 includes the antenna module 100 and a BBIC 200, which constitutes a baseband signal processing circuit. The antenna module 100 includes an RFIC 110, which is an example of a feed device, and an antenna device 120. The communication device 10 up-converts a signal, which is transmitted from the BBIC 200 to the antenna module 100, to a radio frequency signal at the RFIC 110 and radiates the radio frequency signal from the antenna device 120. Further, the communication device 10 transmits a radio frequency signal, which is received at the antenna device 120, to the RFIC 110 so as to down-convert the radio frequency signal and process the obtained signal at the BBIC 200.

The antenna module 100 is a so-called multi-band type antenna module that can radiate radio waves in three mutually-different frequency bands. The antenna device 120 includes a plurality of radiating elements 121 that radiate radio waves in a first frequency band f1, a plurality of radiating elements 122 that radiate radio waves in a second frequency band f2, and a plurality of radiating elements 123 that radiate radio waves in a third frequency band f3. In the antenna module 100, the first frequency band f1 of the radiating element 121 is relatively the lowest frequency and the third frequency band f3 of the radiating element 123 is relatively the highest frequency. That is, the magnitude relationship among the frequencies of radio waves radiated from the three radiating elements is expressed as $f1<f2<f3$.

In the example illustrated in FIG. 1, the radiating element 121 and the radiating element 122 are arranged in a stacked manner in a dielectric substrate, and the radiating element 123 is arranged in the dielectric substrate. Pairs of the radiating element 121 and the radiating element 122 which are stacked and the radiating elements 123 are alternately arranged in one direction. FIG. 1 illustrates the example of the configuration of the antenna device 120 in which the radiating elements are arranged in a two-dimensional array, but the antenna device 120 may have a configuration in which radiating elements are aligned in a one-dimensional array. Alternatively, the antenna device 120 may have a configuration in which the radiating elements 121, 122, and 123 are provided one by one. In the present embodiment, each of the radiating elements 121, 122, and 123 is a patch antenna having a flat-plate shape.

The RFIC 110 includes a feed circuit corresponding to each frequency band, in other words, a feed circuit corresponding to each radiating element. Namely, the RFIC 110 includes a feed circuit 110A corresponding to the radiating elements 121, a feed circuit 110B corresponding to the radiating elements 122, a feed circuit 110C corresponding to the radiating elements 123. FIG. 1 only illustrates the configuration corresponding to four radiating elements for the feed circuit 110A corresponding to the radiating elements 121 and omits the illustration of the same configurations corresponding to other radiating elements, for the sake of simpler description. That is, the configurations of the feed circuits 110B and 110C are the same as the configuration of the feed circuit 110A.

The feed circuit 110A includes switches 111A to 111D, 113A to 113D, and 117; power amplifiers 112AT to 112DT; low noise amplifiers 112AR to 112DR; attenuators 114A to 114D; phase shifters 115A to 115D; a signal synthesizer/demultiplexer 116; a mixer 118; and an amplifying circuit 119.

In transmitting a radio frequency signal, the switches 111A to 111D and 113A to 113D are switched to the power amplifiers 112AT to 112DT sides and the switch 117 is connected to a transmission amplifier of the amplifying circuit 119. In receiving a radio frequency signal, the switches 111A to 111D and 113A to 113D are switched to the low noise amplifiers 112AR to 112DR sides and the switch 117 is connected to a reception amplifier of the amplifying circuit 119.

A signal transmitted from the BBIC 200 is amplified in the amplifying circuit 119 and up-converted in the mixer 118. A transmission signal that is the up-converted radio frequency signal is demultiplexed into four signals in the signal synthesizer/demultiplexer 116 and fed to respective mutually-different radiating elements 121 through four respective signal paths. At this time, the directivity of the antenna device 120 can be adjusted by individually adjusting phase levels of the phase shifters 115A to 115D arranged on respective signal paths. The attenuators 114A to 114D adjust strength of a transmission signal.

Reception signals which are radio frequency signals received by respective radiating elements 121 pass through four respective different signal paths and synthesized in the signal synthesizer/demultiplexer 116. The synthesized reception signal is down-converted in the mixer 118 and amplified in the amplifying circuit 119 to be transmitted to the BBIC 200.

The RFIC 110 is formed as one chip of integrated circuit component having the above-described circuit configuration, for example. Alternatively, the RFIC 110 may be formed as an individual integrated circuit component for each feed circuit. Further, devices (switch, power amplifier, low noise amplifier, attenuator, phase shifter) corresponding to each radiating element may be formed as one chip of integrated circuit component for each corresponding radiating element.

(Configuration of Antenna Module)

Figure 2:
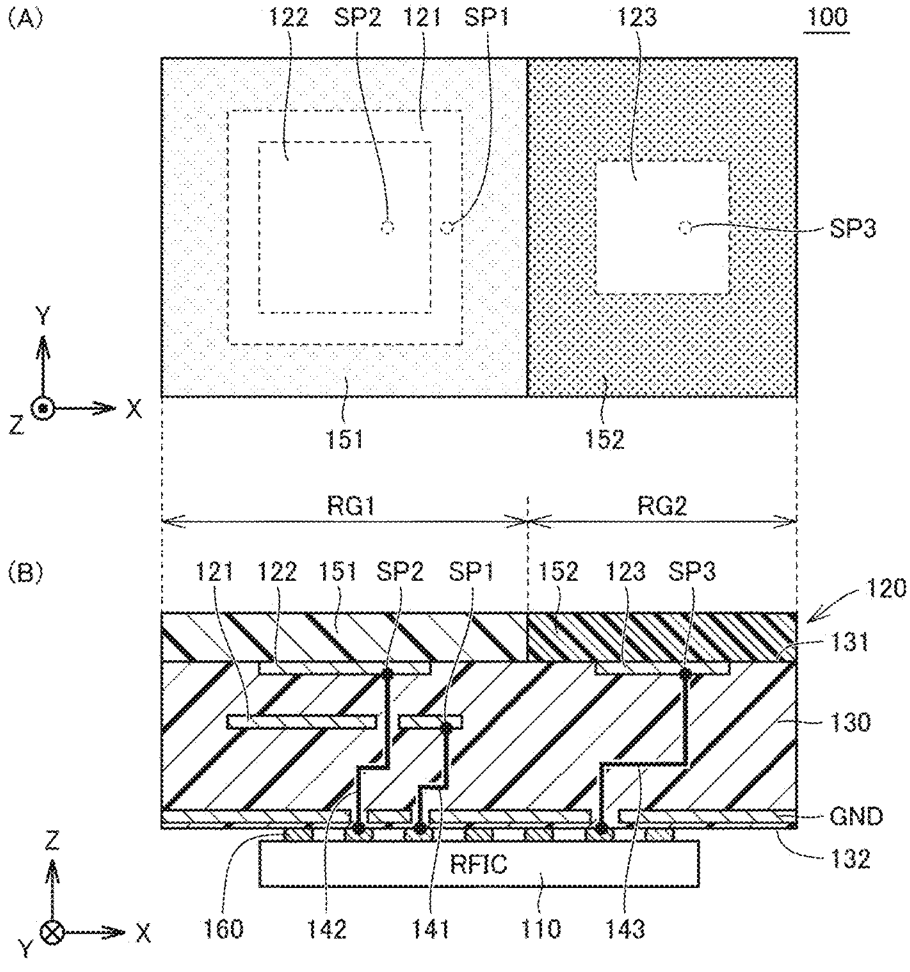
FIG. 2 is a plan view and a side perspective view of the antenna module of FIG. 1.

The configuration of the antenna module 100 according to the first embodiment will now be described in detail with reference to FIG. 2. FIG. 2 is a diagram illustrating the antenna module 100 according to the first embodiment. In FIG. 2, a plan view (FIG. 2(A)) of the antenna module 100 is illustrated on the upper side, and a side perspective view (FIG. 2(B)) is illustrated on the lower side. Here, FIG. 2 illustrates an example of the configuration in which each of the radiating elements 121, 122, and 123 is composed of one electrode, for the sake of simpler description.

The antenna module 100 includes a dielectric substrate 130, feed wiring 141, feed wiring 142, feed wiring 143, dielectric layers 151 and 152, and a ground electrode GND in addition to the radiating elements 121, 122, and 123 and the RFIC 110. In the following description, a normal direction of the dielectric substrate 130 (a direction of radio wave radiation) is defined as a Z-axis direction. Further, on a surface orthogonal to the Z-axis direction, an array direction of radiating elements is defined as an X axis and a direction orthogonal to the X axis is defined as a Y axis. Further, a positive direction of the Z axis in each drawing may be referred to as an upper side and a negative direction of the same may be referred to as a lower side.

The dielectric substrate 130 is, for example, a low temperature co-fired ceramics (LTCC) multi-layer substrate; a multi-layer resin substrate, which is formed by laminating a plurality of resin layers made of resin such as epoxy or polyimide; a multi-layer resin substrate, which is formed by laminating a plurality of resin layers made of liquid crystal polymer (LCP) having a lower dielectric constant; a multi-layer resin substrate, which is formed by laminating a plurality of resin layers made of fluorine resin; a multi-layer resin substrate, which is formed by laminating a plurality of resin layers made of polyethylene terephthalate (PET) material; or a multi-layer substrate made of ceramics other than LTCC. Here, the dielectric substrate 130 does not necessarily have to have a multi-layer structure but may be a single-layer substrate.

The dielectric substrate 130 has a rectangular shape in plan view in the normal direction (the Z-axis direction). The ground electrode GND is arranged over the entire surface of the dielectric substrate 130 at a position close to a lower surface 132 of the dielectric substrate 130. The radiating elements 122 and 123 are arranged adjacent to each other in the X-axis direction at positions close to an upper surface 131 (a surface in the positive direction of the Z axis) of the dielectric substrate 130. The radiating elements 122 and 123 may be arranged to be exposed on the surface of the dielectric substrate 130 or may be arranged inside the dielectric substrate 130.

The radiating element 121 is arranged between the radiating element 122 and the ground electrode GND. In plan view in the normal direction of the dielectric substrate 130 (the Z-axis direction), the radiating element 122 overlaps with the radiating element 121.

Each of the radiating elements 121, 122, and 123 is a flat-plate like electrode having a rectangular shape. The size of the radiating element 122 is smaller than the size of the radiating element 121, and the size of the radiating element 123 is further smaller than the size of the radiating element 122. That is, the resonant frequency of the radiating element 122 is higher than the resonant frequency of the radiating element 121, and the resonant frequency of the radiating element 123 is higher than the resonant frequency of the radiating element 122. Accordingly, the frequency band (second frequency band) f2 of a radio wave radiated from the radiating element 122 is higher than the frequency band (first frequency band) f1 of a radio wave radiated from the radiating element 121. Further, the frequency band (third frequency band) f3 of a radio wave radiated from the radiating element 123 is higher than the frequency band f2 of a radio wave radiated from the radiating element 122. In the example of the first embodiment, center frequencies of the frequency bands of the radiating elements 121, 122, and 123 are 28 GHz, 39 GHz, and 60 GHz respectively.

The radiating elements 121, 122, and 123 are supplied with a radio frequency signal from the RFIC 110 via the respective pieces of feed wiring 141, 142, and 143. The feed wiring 141 is connected to a feed point SP1 of the radiating element 121 from the RFIC 110 through the ground electrode GND. Further, the feed wiring 142 is connected to a feed point SP2 of the radiating element 122 from the RFIC 110 through the ground electrode GND and the radiating element 121. The feed wiring 143 is connected to a feed point SP3 of the radiating element 123 from the RFIC 110 through the ground electrode GND. The feed point SP1 is offset from the center of the radiating element 121 in the positive direction of the X axis. The feed point SP2 is offset from the center of the radiating element 122 in the positive direction of the X axis. The feed point SP3 is offset from the center of the radiating element 123 in the positive direction of the X axis. Accordingly, a radio wave whose polarization direction is the X-axis direction is radiated from each of the radiating elements 121, 122, and 123.

On the lower surface 132 of the dielectric substrate 130, the RFIC 110 is mounted with solder bumps 160 interposed therebetween. However, the RFIC 110 may be connected to the dielectric substrate 130 with a multipole connector instead of solder connection.

On the upper surface 131 of the dielectric substrate 130, the dielectric layer 151 is arranged in a region (first region) RG1 covering the radiating elements 121 and 122, and the dielectric layer 152 is arranged in a region (second region) RG2 covering the radiating element 123. The dielectric constants of the dielectric layers 151 and 152 are both larger than the dielectric constant of the dielectric substrate 130, and in addition, the dielectric constant ε1 of the dielectric layer 151 is larger than the dielectric constant ε2 of the dielectric layer 152 (ε1>ε2) In the first embodiment, the thickness of the dielectric layer 151 is almost the same as the thickness of the dielectric layer 152.

Regarding a patch antenna having a flat-plate shape, assuming a Q value is lowered, a frequency bandwidth tends to expand, in general. A Q value is determined depending on a ratio of radiated power and stored power of a radiating element and a ground electrode. For example, assuming a distance between a radiating element and a ground electrode is increased or a dielectric constant between a radiating element and a ground electrode is lowered, a Q value decreases and a frequency bandwidth expands.

Assuming an upper portion of a radiating element is covered by a dielectric layer having a higher dielectric constant than a dielectric substrate, a surface acoustic wave generated in the radiating element tends to be stronger and lines of electric force generated in a direction from an end portion of the radiating element along an electrode surface travel farther compared to a configuration without a dielectric layer having a high dielectric constant. Thus, the path lengths of the lines of electric force from the radiating element to the ground electrode are elongated, which is consequently equivalent to a state in which the distance between the radiating element and the ground electrode is increased. Accordingly, by covering the upper portion of a radiating element by a dielectric layer having a high dielectric constant, the Q value of a patch antenna decreases and the frequency bandwidth consequently expands.

The effect of a dielectric layer on surface acoustic waves increases as a dielectric constant of the dielectric layer increases. Therefore, the effect of expanding a frequency bandwidth increases as the dielectric constant is increased. The path length of lines of electric force, however, increases and therefore, unwanted mode resonance more easily occurs disadvantageously. That is, the expansion of the frequency bandwidth and the occurrence of unwanted mode resonance mutually have a trade-off relationship.

Here, the effect of a dielectric layer on a surface acoustic wave tends to be sensitive as the frequency of a radio wave radiated from a radiating element increases. Therefore, assuming dielectric layers have the mutually-same thickness, it is necessary to lower the dielectric constant as the frequency of a radiated radio wave increases.

Assuming three types of radiating elements in mutually-different frequency bands are arranged on a common dielectric substrate as the antenna module of this first embodiment, it is sometimes impossible to adapt the material and dimensions of the dielectric substrate to all the radiating elements due to restrictions in the area available for arrangement of the radiating elements on the dielectric substrate or manufacturing restrictions.

For example, assuming the dielectric constant of a dielectric substrate is set to a dielectric constant adapted to a radiating element on the lower frequency side, the set dielectric constant may be too high for a radiating element on the higher frequency side. In this case, there is a possibility that a sufficient frequency bandwidth cannot be secured or unwanted mode resonance easily occurs due to a wavelength reduction effect. On the other hand, assuming the dielectric constant of a dielectric substrate is set to a dielectric constant adapted to a radiating element on the higher frequency side, the set dielectric constant is lower than a dielectric constant suitable for the thickness of the dielectric substrate with respect to the radiating element on the lower frequency side and therefore, the thickness of the dielectric substrate needs to be increased. This may cause inhibition in miniaturization of the antenna module.

Assuming three types of radiating elements are arranged as the first embodiment, the radiating elements sometimes cannot be individually arranged due to the restriction of dimensions of a dielectric substrate. Especially in an array antenna in which a plurality of respective types of radiating elements are arrayed, the spacing between the radiating elements is too wide for the radiating elements on the higher frequency side, which may cause problems such as decrease in antenna gain and generation of grating lobes.

Under the circumstances, in the antenna module 100 according to the first embodiment, two radiating elements 121 and 122 corresponding to mutually-close frequency bands are arranged in a stack structure among the three types of radiating elements, and the radiating elements 121 and 122 in the stack structure and the radiating element 123 are arranged adjacent to each other on the dielectric substrate 130. Accordingly, an arrangement area of the radiating elements in the dielectric substrate 130 can be reduced compared to the configuration in which radiating elements are individually arranged.

Further, in the antenna module 100, a dielectric layer with a dielectric constant suitable for each radiating element is arranged in each of the region RG1, in which the radiating elements 121 and 122 in the stack structure are arranged, and the region RG2, in which the radiating element 123 is arranged, on the dielectric substrate 130. This makes it possible to individually adjust the strength of surface acoustic waves of the radiating elements on the lower frequency side (the radiating elements 121 and 122) and the radiating element 123 on the higher frequency side. Accordingly, even assuming all the radiating elements are arranged in the common dielectric substrate 130, the frequency bandwidths for the respective radiating elements can be appropriately expanded. Here, degradation in beam pattern caused by the surface acoustic wave of the radiating element 123 can be mitigated by setting the dielectric constant cl of the dielectric layer 151 on the lower frequency side larger than the dielectric constant ε2 of the dielectric layer 152 on the higher frequency side.

Figure 3:
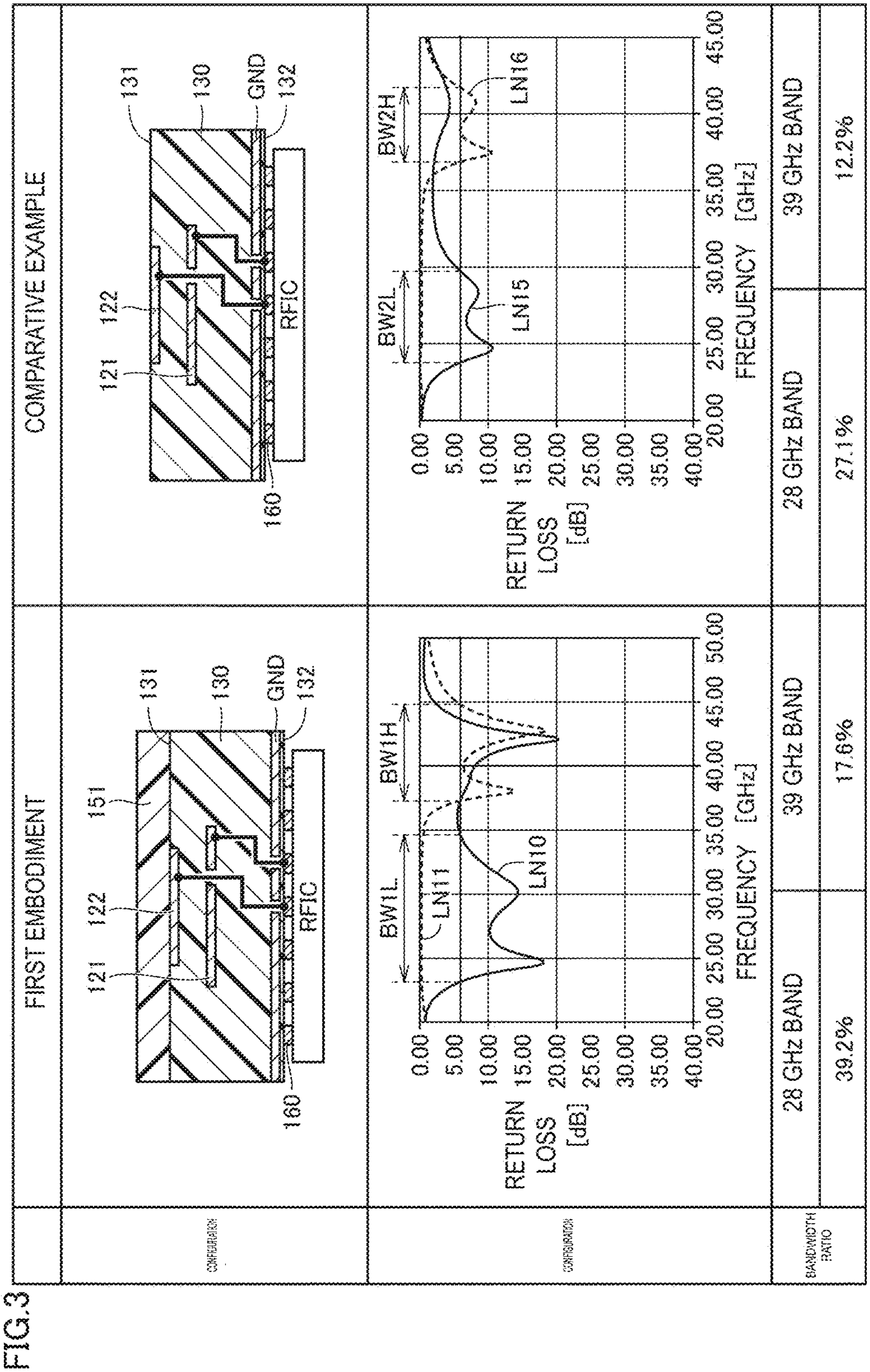
FIG. 3 is a diagram for explaining an advantageous effect of a dielectric layer in antenna characteristics of radiating elements forming a stack structure, in the antenna module of FIG. 1.

Regarding the radiating elements 121 and 122 in the stack structure, the common dielectric layer 151 is provided for the mutually-different frequency bands. FIG. 3 shows the results of simulation regarding the effect of expanding the frequency bandwidths for the radiating elements 121 and 122 in such a configuration. FIG. 3 shows return loss in the case where the dielectric layer 151 is arranged (first embodiment) and the case where the dielectric layer 151 is not arranged (comparative example) in the region RG1 in which the radiating elements 121 and 122 are arranged. In FIG. 3, solid lines LN10 and LN15 indicate the return loss of the radiating element 121 and dashed lines LN11 and LN16 indicate the return loss of the radiating element 122. Here, FIG. 3 evaluates bandwidths in which 6 dB return loss is achieved.

As illustrated in FIG. 3, a bandwidth BW1L for the radiating element 121 of the first embodiment is larger than a bandwidth BW2L in the comparative example (BW1L>BW2L). Regarding a bandwidth ratio that is a ratio of a bandwidth with respect to a center frequency, the comparative example shows 27.1%, while the first embodiment shows 39.2%, which is improved.

As for the radiating element 122, a bandwidth BW1H in the first embodiment is larger than a bandwidth BW2H in the comparative example (BW1H>BW2H), and the bandwidth ratio is also improved from 12.2% to 17.6%.

Thus, even assuming radiating elements are arranged in a stack structure, the frequency bands for both of the radiating elements 121 and 122 can be expanded by arranging a dielectric layer having a higher dielectric constant than the dielectric substrate on the upper surface of the dielectric substrate.

As for the radiating element 123 which is individually arranged, the frequency band can be expanded by arranging the dielectric layer 152, which has the dielectric constant suitable for the radiating element 123, compared to the configuration without the dielectric layer 152.

As described above, in an antenna module in which radiating elements corresponding to three mutually-different frequency bands are arranged, two radiating elements corresponding to mutually-close frequency bands are arranged as a stack structure in a manner to be adjacent to the rest of the radiating elements, and dielectric layers having dielectric constants, which correspond to the radiating elements to be arranged, are arranged in respective regions, in which the radiating elements are arranged, on the dielectric substrate. This configuration can suppress increase in an arrangement area in the dielectric substrate and realize broadband in antenna characteristics of each of the radiating elements.

Here, the "radiating elements 121, 122, and 123" of the first embodiment correspond to a "first radiating element", a "second radiating element", and a "third radiating element" in the present disclosure respectively. The "upper surface 131" and the "lower surface 132" of the dielectric substrate 130 in the first embodiment correspond to a "first surface" and a "second surface" in the present disclosure respectively.

First Modification

The first embodiment has described the configuration in which two radiating elements which are on the relatively lower frequency side are formed in a stack structure among three radiating elements. A first modification will describe a configuration in which two radiating elements which are on the relatively higher frequency side are formed in a stack structure among three radiating elements.

Figure 4:
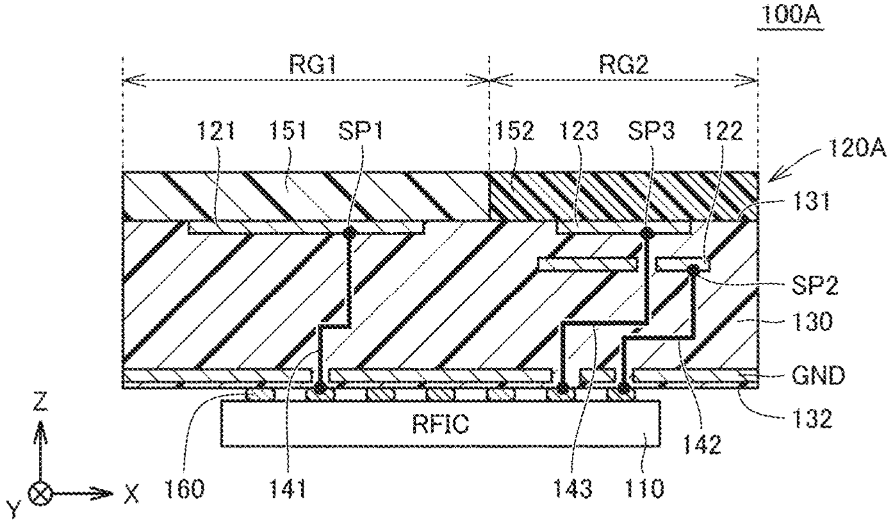
FIG. 4 is a side perspective view of an antenna module according to a first modification.

FIG. 4 is a side perspective view of an antenna module 100A according to a first modification. Referring to FIG. 4, in an antenna device 120A of the antenna module 100A, the radiating element 121 corresponding to the lowest frequency band is singularly arranged on the dielectric substrate 130 and two radiating elements 122 and 123 on the relatively higher frequency side are arranged as a stack structure in the dielectric substrate 130, among the three radiating elements. Specifically, the radiating element 122 is arranged between the radiating element 123 and the ground electrode GND in the normal direction of the dielectric substrate 130 (the Z-axis direction). Not illustrated in FIG. 4, the radiating element 123 overlaps with the radiating element 122, in plan view in the normal direction of the dielectric substrate 130. The feed wiring 143 for transmitting a radio frequency signal to the radiating element 123 is connected to the feed point SP3 of the radiating element 123 from the RFIC 110 through the ground electrode GND and the radiating element 122.

On the dielectric substrate 130, the dielectric layer 151 is arranged in the region RG1 covering the radiating element 121, and the dielectric layer 152 is arranged in the region RG2 covering the radiating elements 122 and 123. Here, the dielectric constants of the dielectric layers 151 and 152 do not necessarily have to be the same as the dielectric constants of the first embodiment and the dielectric constants are appropriately selected depending on characteristics required for each radiating element.

The configuration of the antenna module 100A of the first modification is preferable assuming the frequency band for the radiating element 122 is closer to the frequency band for the radiating element 123 than the frequency band for the radiating element 121.

As described above, in the antenna module 100A according to the first modification as well, two radiating elements corresponding to mutually-close frequency bands are arranged as a stack structure, and dielectric layers having dielectric constants, which correspond to the radiating elements to be arranged, are arranged in respective regions, in which the radiating elements are arranged, on the dielectric substrate. This configuration can suppress increase in an arrangement area in the dielectric substrate and realize broadband in antenna characteristics of each of the radiating elements.

Second Modification

A second modification will describe an antenna module having four types of radiating elements corresponding to mutually-different frequency bands.

Figure 5:
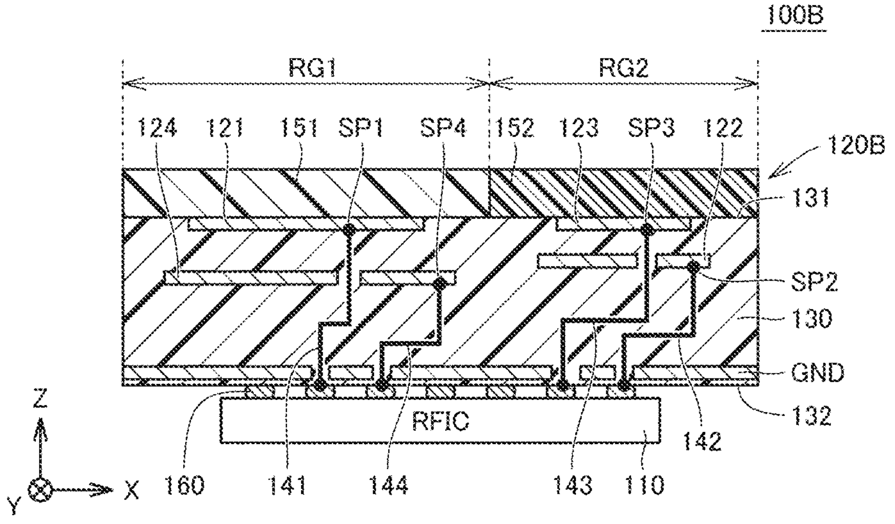
FIG. 5 is a side perspective view of an antenna module according to a second modification.

FIG. 5 is a side perspective view of an antenna module 100B according to a second modification. Referring to FIG. 5, an antenna device 120B of the antenna module 100B includes a radiating element 124 in addition to the radiating elements 121, 122, and 123. In the example of the antenna module 100B, a frequency band (fourth frequency band) f4 of a radio wave radiated from the radiating element 124 is lower than the frequency bands of the radio waves radiated from the radiating elements 121, 122, and 123 ($f4<f1<f2<f3$).

In the antenna module 100B, the radiating elements 121 and 124 are arranged in a stack structure and the radiating elements 122 and 123 are arranged in a stack structure. The radiating element 124 is arranged between the radiating element 121 and the ground electrode GND. The radiating element 124 is supplied with a radio frequency signal from the RFIC 110 via feed wiring 144. The feed wiring 144 is connected to a feed point SP4 of the radiating element 124 from the RFIC 110 through the ground electrode GND. The feed wiring 141 for supplying a radio frequency signal to the radiating element 121 is connected to the feed point SP1 of the radiating element 121 from the RFIC 110 through the ground electrode GND and the radiating element 124.

On the dielectric substrate 130, the dielectric layer 151 is arranged in the region RG1 covering the radiating elements 121 and 124, and the dielectric layer 152 is arranged in the region RG2 covering the radiating elements 122 and 123. The dielectric constants of the dielectric layers 151 and 152 are determined depending on characteristics required for each radiating element.

The above description is provided on the example in which the frequency band of the radio wave radiated from the radiating element 124 is lower than those of other radiating elements 121, 122, and 123, but the frequency band for the radiating element 124 is not limited to this. Combinations of radiating elements forming a stack structure are appropriately determined depending on the frequency band of the radiating element 124.

As described above, in the antenna module including four types of radiating elements corresponding to mutually-different frequency bands as well, two radiating elements corresponding to mutually-close frequency bands are arranged as a stack structure, and dielectric layers having dielectric constants, which correspond to the radiating elements to be arranged, are arranged in respective regions, in which the radiating elements are arranged, on the dielectric substrate. This configuration can suppress increase in an arrangement area in the dielectric substrate and realize broadband in antenna characteristics of each of the radiating elements.

The "radiating element 124" in the second modification corresponds to a "fourth radiating element" in the present disclosure.

Second Embodiment

A second embodiment will describe an example in which an antenna module is an array antenna in which a plurality of electrodes included in respective radiating elements are arranged in an array.

Figure 6:
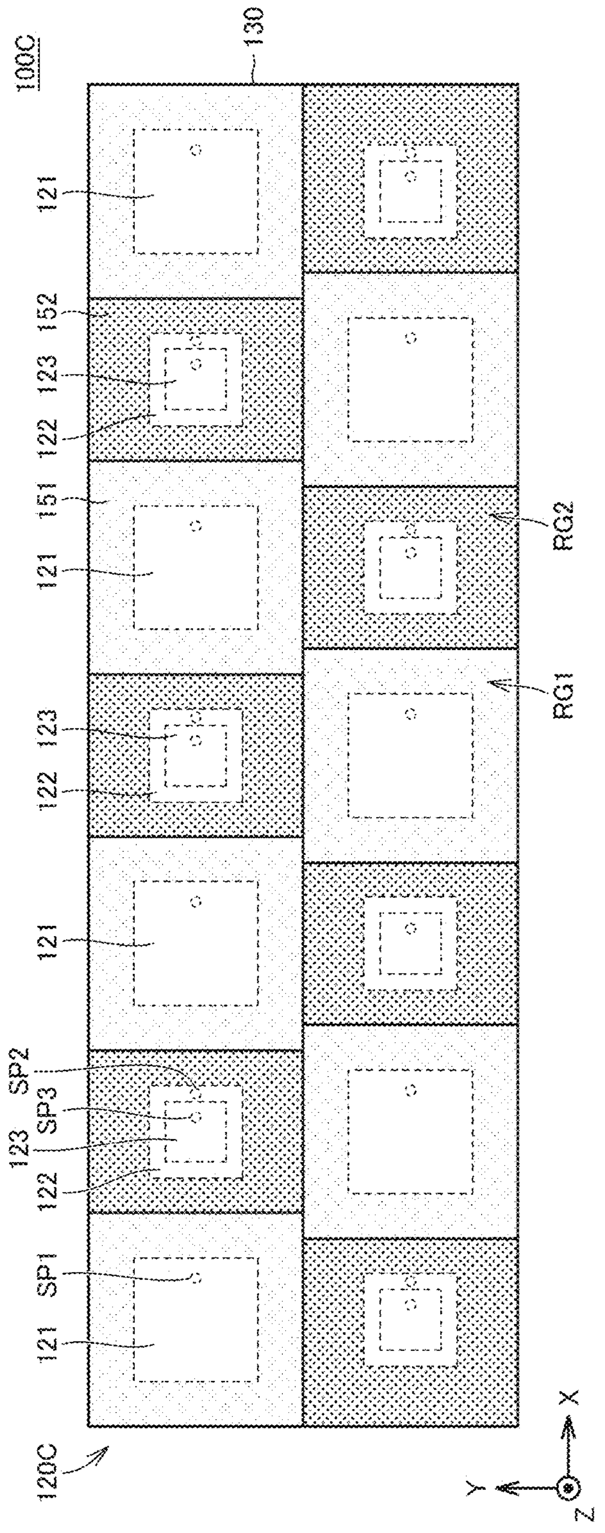
FIG. 6 is a plan view of an antenna module according to a second embodiment.

FIG. 6 is a plan view of an antenna module 100C according to the second embodiment. In an antenna device 120C of the antenna module 100C in FIG. 6, electrodes included in respective radiating elements are alternately arranged in the X-axis direction and the Y-axis direction to form an array. More specifically, the electrodes of the radiating elements 122 and 123 on the higher frequency side form a stack structure, and the electrode of the radiating element 121 is singularly arranged on the dielectric substrate 130, as the above-described first modification. The radiating elements 121 and the stack structures of the radiating elements 122 and 123 are alternately arranged in the X-axis direction and the Y-axis direction.

On the dielectric substrate 130, the dielectric layer 151 is arranged in the region RG1 covering the electrode of the radiating element 121, and the dielectric layer 152 is arranged in the region RG2 covering the electrodes of the radiating elements 122 and 123. Here, plan views of FIG. 6 and later-described FIGS. 11 and 12 omit hatching for a portion overlapping with each radiating element in the dielectric layers 151 and 152, for the sake of simpler description.

As described above, in the array antenna as well, two radiating elements corresponding to mutually-close frequency bands are arranged as a stack structure among the three types of radiating elements corresponding to mutually-different frequency bands, and dielectric layers having dielectric constants, which correspond to the radiating elements to be arranged, are arranged in respective regions, in which the radiating elements are arranged, on the dielectric substrate. This configuration can suppress increase in an arrangement area in the dielectric substrate and realize broadband in antenna characteristics of each of the radiating elements.

Third Modification

A third modification will describe an example of a configuration in which dielectric layers arranged in respective regions have mutually different thickness.

Figure 7:
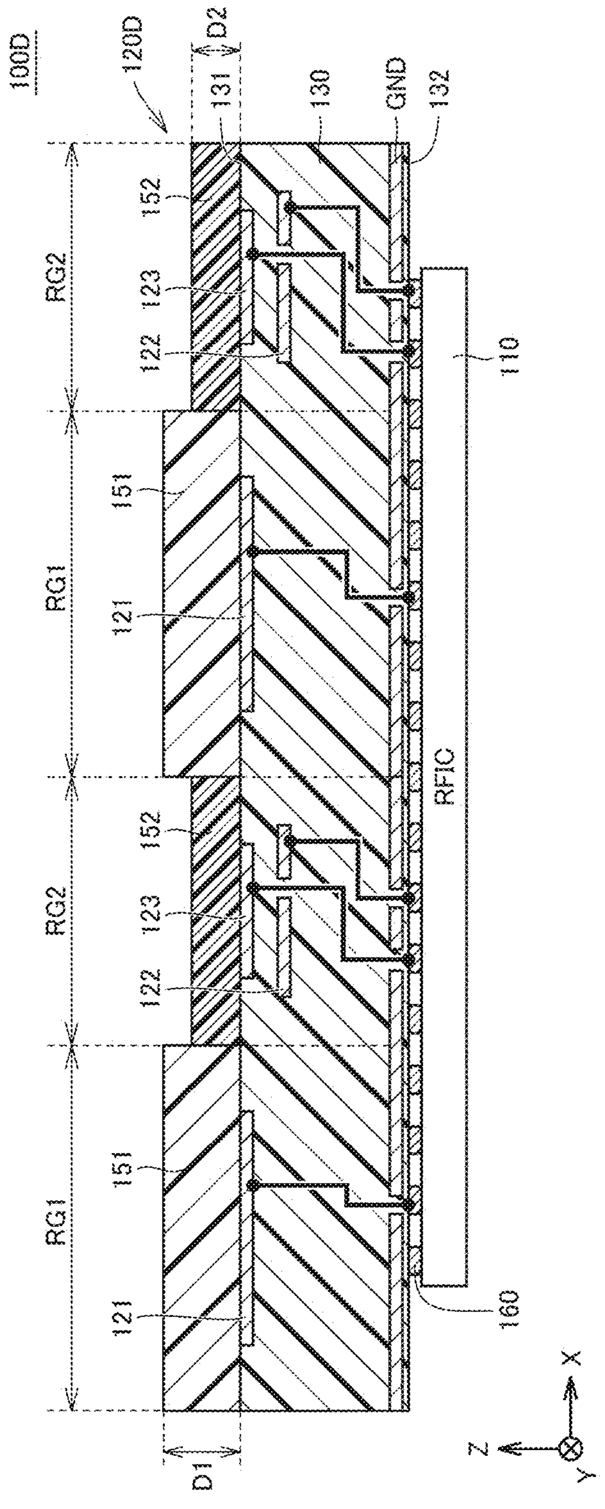
FIG. 7 is a side perspective view of an antenna module according to a third modification.

FIG. 7 is a side perspective view of an antenna module 100D according to the third modification. An antenna device 120D of the antenna module 100D is an array antenna in which the electrodes of the radiating elements 122 and 123 on the higher frequency side are provided in a stack structure, and the electrode of the radiating element 121 on the lower frequency side is singularly arranged, as is the case with the second embodiment. Here, FIG. 7 illustrates an example of the configuration in which each of the radiating elements 121, 122, and 123 includes two electrodes.

The dielectric layer 151 is arranged in the region RG1 covering the electrodes of the radiating element 121, and the dielectric layer 152 is arranged in the region RG2 covering the electrodes of the radiating elements 122 and 123 forming the stack structure. Here, the thickness (dimension in the Z-axis direction) D1 of the dielectric layer 151 is larger than the thickness D2 of the dielectric layer 152 (D1>D2) in the antenna module 100D. Assuming the thickness of a dielectric layer is increased, a substantial dielectric constant viewed from a radiating element increases. Accordingly, the configuration as that of the antenna module 100D can make the dielectric constant of the dielectric layer 151 further larger than the dielectric constant of the dielectric layer 152, compared to the configuration in which the dielectric layers have the same thickness as the first embodiment. Further, even assuming the dielectric layer 151 and the dielectric layer 152 are made of the same materials, the substantial dielectric constant of the dielectric layer 151 viewed from the radiating element can be increased to be larger than that of the dielectric layer 152 by allowing the dielectric layer 151 to have the larger thickness than the thickness of the dielectric layer 152.

Fourth Modification

A fourth modification will describe a configuration in which the position of a ground electrode in a dielectric substrate varies depending on regions in which dielectric layers are arranged.

Figure 8:
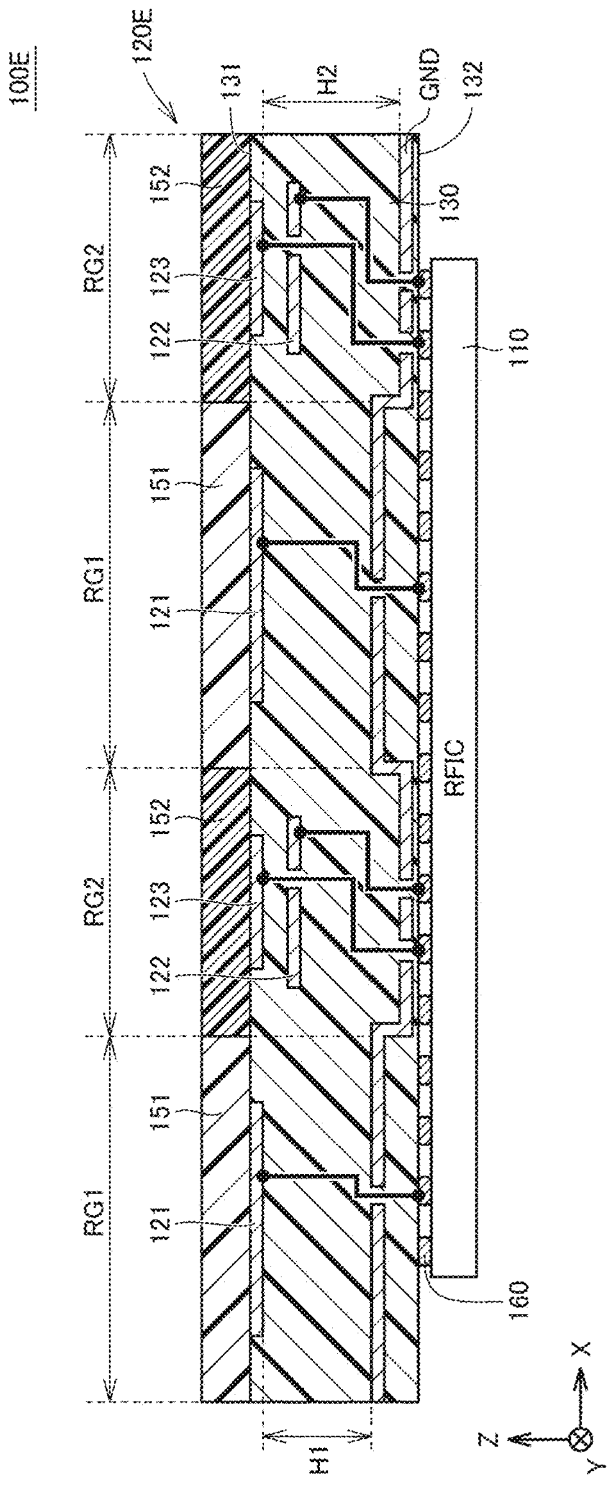
FIG. 8 is a side perspective view of an antenna module according to a fourth modification.

FIG. 8 is a side perspective view of an antenna module 100E according to the fourth modification. An antenna device 120E of the antenna module 100E is an array antenna in which the electrodes of the radiating elements 122 and 123 on the higher frequency side are provided in a stack structure, and the electrode of the radiating element 121 on the lower frequency side is singularly arranged, as is the case with the third modification. The thickness of the dielectric layer 151 and the thickness of the dielectric layer 152 are set to be the same as each other in the antenna module 100E. Further, in the antenna module 100E, the ground electrode GND in the region RG1 in which the dielectric layer 151 is arranged is arranged on a position closer to the upper surface 131 than the ground electrode GND in the region RG2 in which the dielectric layer 152 is arranged. In other words, a distance H1 between the radiating element 121 and the ground electrode GND is shorter than a distance H2 between the radiating element 123 and the ground electrode GND.

In general, the frequency bandwidth of a radiating element in a patch antenna is affected by the distance between the radiating element and a ground electrode, and the frequency bandwidth is increased as the distance increases. In the stack structure of the radiating elements in the region RG2, the radiating element 123 is coupled with the radiating element 122 to operate as an antenna, and the radiating element 122 substantially functions as a ground electrode. Meanwhile, the radiating element 122 is coupled with the ground electrode GND to operate as an antenna. Accordingly, the overall thickness of the dielectric substrate 130 (that is, the distance H2 between the radiating element 123 and the ground electrode GND) is sometimes increased so as to ensure desired frequency bandwidth for the radiating elements 122 and 123. In this case, the distance to the ground electrode GND from the radiating element 121, which is singularly arranged in the dielectric substrate 130, may be longer than the distance suitable for characteristics of the radiating element 121.

In the antenna module 100E, the distance between the radiating element 121 and the ground electrode GND can be set to the distance suitable for the characteristics of the radiating element 121 by setting the position of the ground electrode GND in the region RG1, in which the radiating element 121 on the lower frequency side is arranged, closer to the upper surface 131 than the position of the ground electrode GND in the region RG2. Accordingly, degradation in antenna characteristics in each radiating element can be suppressed.

Fifth Modification

The fourth modification has described the configuration in which the distance between the radiating element 121 and the ground electrode GND is adjusted by the position of the ground electrode GND. A fifth modification will describe a configuration in which the ground electrode GND is arranged at the same position in the region RG1 and the region RG2 and the distance from the ground electrode GND is adjusted by the position of the radiating element 121.

Figure 9:
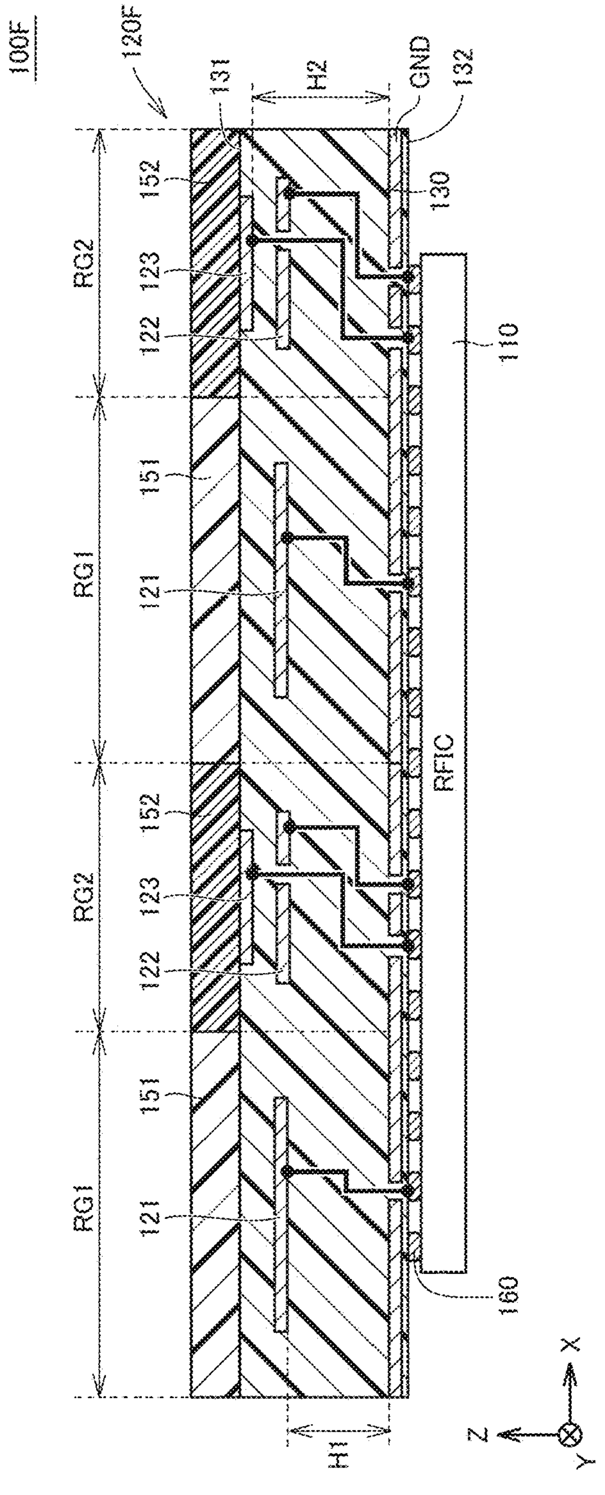
FIG. 9 is a side perspective view of an antenna module according to a fifth modification.

FIG. 9 is a side perspective view of an antenna module 100F according to the fifth modification. In an antenna device 120F of the antenna module 100F, the radiating element 121, which is singularly arranged in the dielectric substrate 130, is arranged closer to the ground electrode GND than the radiating element 123. This configuration can set the distance H1 between the radiating element 121 and the ground electrode GND to the distance suitable for the antenna characteristics of the radiating element 121.

Here, there is part of the dielectric substrate 130 on the closer side to the upper surface 131 than the radiating element 121 in the antenna module 100F. Therefore, the total amount of dielectric in the radiation direction is larger than that in the antenna module 100E of the fourth modification. Accordingly, the dielectric constant of the dielectric layer 151 arranged in the region RG1 is preferably adjusted depending on the amount of the dielectric substrate 130 between the radiating element 121 and the upper surface 131.

Sixth Modification

A sixth modification will describe a configuration in which the ground electrode GND is arranged at the same position like the fifth modification and the thickness of dielectric layers on radiating elements differs in the region RG1 and the region RG2.

Figure 10:
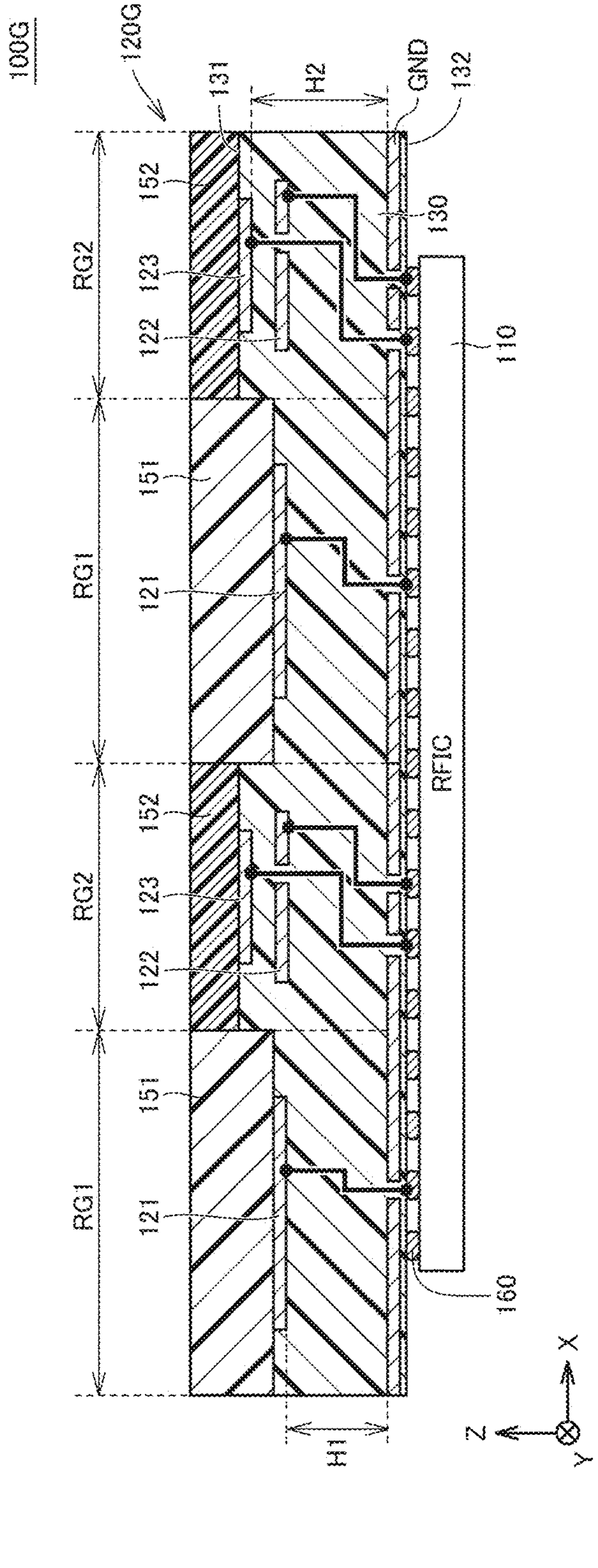
FIG. 10 is a side perspective view of an antenna module according to a sixth modification.

FIG. 10 is a side perspective view of an antenna module 100G according to the sixth modification. In an antenna device 120G of the antenna module 100G, the ground electrode GND is arranged on the same position in the Z-axis direction over the entire area of the dielectric substrate 130, and the position of the radiating element 121, which is arranged in the region RG1, is closer to the ground electrode GND than the radiating element 123, as is the case with the fifth modification. Further, the dielectric layer 151 in the region RG1 is arranged up to the position at which the dielectric layer 151 is in contact with the radiating element 121 in the antenna module 100G. In other words, the upper surface 131 on the dielectric substrate 130 in the antenna module 100G has a step between the region RG1 and the region RG2, and the thickness (the dimension in the Z-axis direction) of the dielectric substrate 130 in the region RG1 is smaller than the thickness of the dielectric substrate 130 in the region RG2. In the region RG1, the dielectric layer 151 is formed thicker than the dielectric layer 152 so as to fill the above-mentioned smaller thickness.

This configuration can eliminate boundaries of the dielectric layers in the radiation direction of the radiating element 121, being able to reduce return loss caused by boundaries of dielectric layers. Further, the dielectric constant of the dielectric layer on the radiating element 121 can be further increased, being able to realize broadband in the antenna characteristics of the radiating element 121.

Seventh Modification

The second embodiment and the third modification to the sixth modification have described the configuration in which the radiating elements, which are singularly arranged, and the radiating elements, which form the stack structures, are alternately arranged on the dielectric substrate. A seventh modification will describe a configuration in which radiating elements, which are singularly arranged, and radiating elements, which form the stack structures, are collectively arranged in individual regions on a dielectric substrate.

Figure 11:
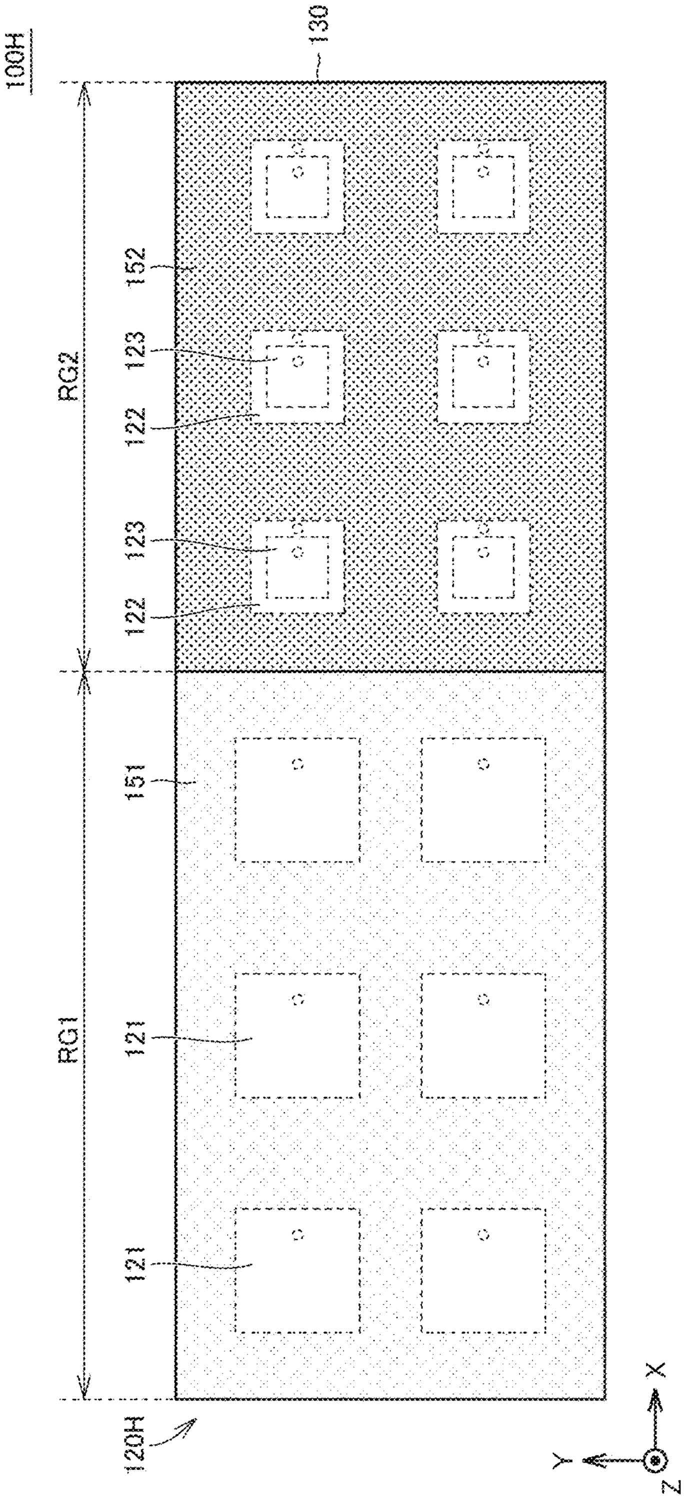
FIG. 11 is a plan view of an antenna module according to a seventh modification.

FIG. 11 is a plan view of an antenna module 100H according to the seventh modification. In an antenna device 120H of the antenna module 100H, six pieces of radiating elements 121 are two-dimensionally arrayed in the region RG1 in the negative direction of the X axis in the dielectric substrate 130, and six pairs of stack structures of the radiating elements 122 and 123 are two-dimensionally arrayed in the region RG2 in the positive direction of the X axis in the dielectric substrate 130. The radiating elements 121 are covered by the dielectric layer 151 in the region RG1, and the radiating elements 122 and 123 are covered by the dielectric layer 152 in the region RG2.

In the configuration in which radiating elements are alternately arranged as the second embodiment, an inter-element pitch between radiating elements corresponding to the same frequency is set to a pitch corresponding to the radiating element 121 on the lower frequency side. In this configuration, the pitch of the radiating elements 122 and 123 on the higher frequency side may be excessively larger than a pitch suitable for these radiating elements. As a result, the antenna characteristics may be degraded due to reduction in antenna gain or generation of grating lobes.

By collectively arranging the radiating elements 121, which are on the lower frequency side, in the region RG1 and collectively arranging the radiating elements 122 and 123, which are on the higher frequency side, in the region RG2 as the seventh modification, the pitch between the radiating elements on the higher frequency side on which the inter-element pitch is relatively small can be set smaller than the pitch of the radiating elements on the lower frequency side, being able to suppress degradation in the antenna characteristics caused by restriction of the inter-element pitch.

Third Embodiment

The above-described embodiments and modifications have described the configuration in which each radiating element radiates a radio wave in one polarization direction. A third embodiment will describe a configuration in which features of the present disclosure are applied to a so-called dual polarization type antenna module that can radiate radio waves in two different polarization directions.

Figure 12:
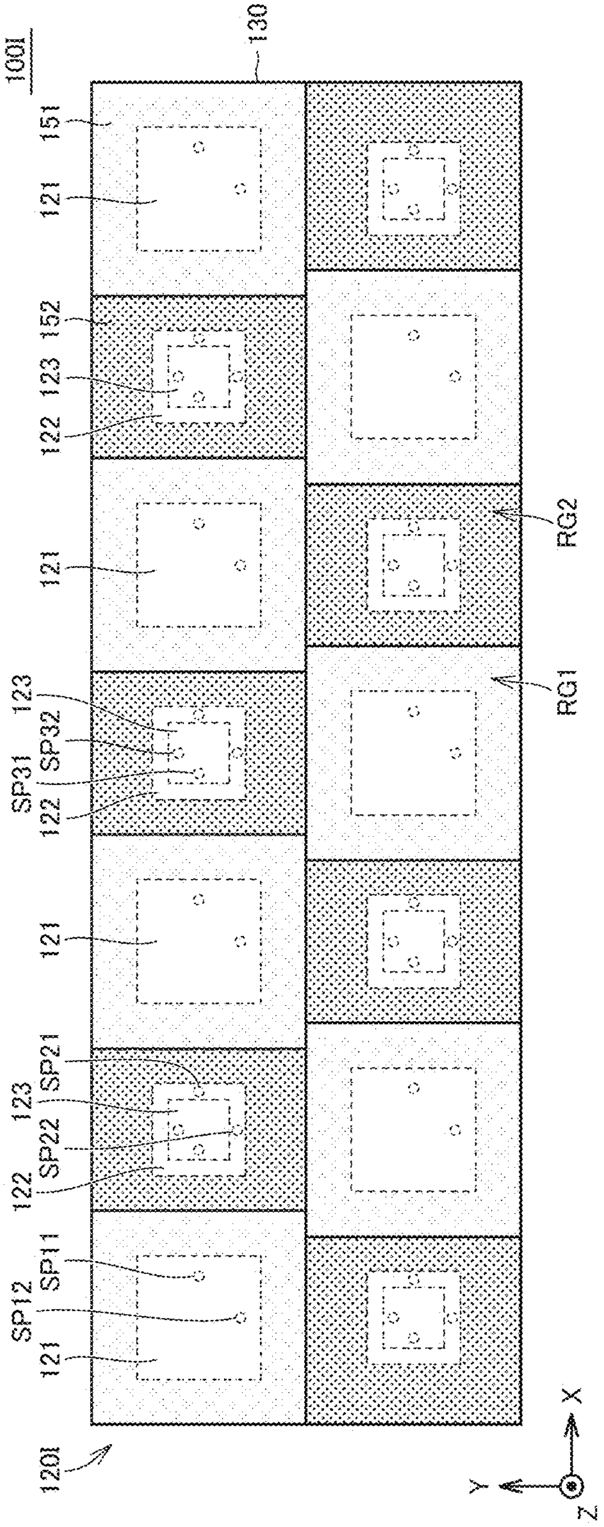
FIG. 12 is a plan view of an antenna module according to a third embodiment.

FIG. 12 is a plan view of an antenna module 100I according to the third embodiment. Referring to FIG. 12, an antenna device 120I of the antenna module 100I is an array antenna in which the radiating elements 121 and the stack structures of the radiating elements 122 and 123 are alternately arranged in a manner to be adjacent to each other, as is the case with the antenna module 100C of FIG. 6. In the antenna module 100I, two feed points are provided with respect to each of the radiating elements 121, 122, and 123.

More specifically, a feed point SP11 is arranged on a position offset from the center of the electrode in the positive direction of the X axis and a feed point SP12 is arranged on a position offset from the center of the electrode in the negative direction of the Y axis, in the radiating element 121. Assuming a radio frequency signal is supplied to the feed point SP11, a radio wave whose polarization direction is the X-axis direction is radiated from the radiating element 121. Meanwhile, assuming a radio frequency signal is supplied to the feed point SP12, a radio wave whose polarization direction is the Y-axis direction is radiated from the radiating element 121.

Similarly, a feed point SP21 is arranged on a position offset from the center of the electrode in the positive direction of the X axis and a feed point SP22 is arranged on a position offset from the center of the electrode in the negative direction of the Y axis, in the radiating element 122. Assuming a radio frequency signal is supplied to the feed point SP21, a radio wave whose polarization direction is the X-axis direction is radiated from the radiating element 122. Meanwhile, assuming a radio frequency signal is supplied to the feed point SP22, a radio wave whose polarization direction is the Y-axis direction is radiated from the radiating element 122.

A feed point SP31 is arranged on a position offset from the center of the electrode in the negative direction of the X axis and a feed point SP32 is arranged on a position offset from the center of the electrode in the positive direction of the Y axis, in the radiating element 123. Assuming a radio frequency signal is supplied to the feed point SP31, a radio wave whose polarization direction is the X-axis direction is radiated from the radiating element 123. Meanwhile, assuming a radio frequency signal is supplied to the feed point SP32, a radio wave whose polarization direction is the Y-axis direction is radiated from the radiating element 123.

The radiating element 122 and the radiating element 123 overlap with each other in plan view in the normal direction of the dielectric substrate 130. Therefore, assuming the positions of feed points corresponding to the same polarization are set in the same direction in the radiating element 122 and the radiating element 123, pieces of feed wiring may come close to be coupled to each other, which may cause degradation in isolation. The feed points of the radiating element 122 are arranged on positions in the opposite direction to positions of the feed points of the radiating element 123, which can suppress degradation in isolation characteristics between radio waves radiated from the radiating element 122 and radio waves radiated from the radiating element 123.

In the above-described antenna module 100I of the dual polarization type as well, the dielectric layer 151 is arranged in the region RG1, in which the radiating element 121 is arranged, and the dielectric layer 152 is arranged in the region RG2, in which the radiating elements 122 and 123 are arranged, being able to realize broadband in antenna characteristics of each radiating element.

The "X-axis direction" and the "Y-axis direction" in the third embodiment correspond to a "first direction" and a "second direction" in the present disclosure respectively.

The above-described embodiments and modifications have described the example in which the radiating element is a patch antenna having a flat-plate shape. However, the above-mentioned features are applicable to a configuration in which each radiating element is a loop antenna.

The configuration in which the dielectric layers 151 and 152 are arranged to be in contact with the dielectric substrate 130 has been described for each of the above-mentioned antenna modules. However, a configuration may be employed in which the dielectric layers 151 and 152 are arranged to be separate from the dielectric substrate 130 and an air layer is provided between the dielectric layers 151 and 152 and the dielectric substrate 130. For example, a configuration may be employed in which the dielectric layers 151 and 152 are arranged on a casing of the communication device 10 and each radiating element of the dielectric substrate 130 arranged on a mounting substrate is arranged to face the dielectric layers 151 and 152.

Further, the configuration in which each radiating element and the ground electrode GND are arranged in the same dielectric substrate 130 has been described for each of the above-mentioned antenna modules. However, the radiating element may be arranged in a substrate different from the substrate in which the ground electrode GND is arranged. In this configuration, pieces of feed wiring are connected by solder bumps or other connecting members between the two substrates.

Furthermore, in the regions RG1 and RG2, the upper surfaces of the dielectric layers 151 and 152 are flat, but the upper surfaces of the dielectric layers 151 and 152 may be uneven.

The embodiments disclosed here should be considered exemplary and not restrictive in all respects. The scope of the present disclosure is indicated by the scope of the claims rather than the description of the above-described embodiments, and is intended to include all changes within the scope and meaning equivalent to the scope of the claims.

REFERENCE SIGNS LIST

10 communication device
100, 100A to 100I antenna module
110 RFIC
110A to 110C feed circuit
111A to 111D, 113A to 113D, 117 switch
112AR to 112DR low noise amplifier
112AT to 112DT power amplifier
114A to 114D attenuator
115A to 115D phase shifter
116 signal synthesizer/demultiplexer
118 mixer
119 amplifying circuit
120, 120A to 120I antenna device
121 to 124 radiating element
130 dielectric substrate
141 to 144 feed wiring
151, 152 dielectric layer
160 solder bump
200 BBIC
GND ground electrode
RG1, RG2 region SP1 to SP4, SP11, SP12, SP21, SP22, SP31, SP32 feed point

The invention claimed is:

1. An antenna module comprising:

a dielectric substrate that has a first surface and a second surface;

a first radiating element, a second radiating element, and a third radiating element that are arranged in the dielectric substrate, have a flat-plate shape, and can radiate respective radio waves in mutually-different frequency bands;

a first dielectric layer that is arranged on the first surface in a manner to cover a first region in which the first radiating element is arranged; and a second dielectric layer that is arranged on the first surface in a manner to cover a second region in which the third radiating element is arranged, wherein the first region and the second region are adjacent to each other, a dielectric constant of the first dielectric layer and a dielectric constant of the second dielectric layer are higher than a dielectric constant of the dielectric substrate, the first radiating element can radiate a radio wave in a first frequency band, the second radiating element can radiate a radio wave in a second frequency band, the second frequency band being higher than the first frequency band, the third radiating element can radiate a radio wave in a third frequency band, the third frequency band being higher than the second frequency band, and the second radiating element overlaps with the first radiating element or the third radiating element in plan view in a normal direction of the dielectric substrate.

2. The antenna module according to claim 1, further comprising:

a ground electrode that is arranged in a manner to be opposed to the first radiating element, the second radiating element, and the third radiating element, wherein the second radiating element overlaps with the first radiating element, and the first radiating element is arranged between the second radiating element and the ground electrode.

3. The antenna module according to claim 1, further comprising:

a ground electrode that is arranged in a manner to be opposed to the first radiating element, the second radiating element, and the third radiating element, wherein the second radiating element overlaps with the third radiating element, and the second radiating element is arranged between the third radiating element and the ground electrode.

4. The antenna module according to claim 3, wherein a distance between the first radiating element and the ground electrode is shorter than a distance between the third radiating element and the ground electrode.

5. The antenna module according to claim 4, wherein the ground electrode in the first region is arranged closer to the first surface than the ground electrode in the second region.

6. The antenna module according to claim 4, wherein the first radiating element is arranged closer to the ground electrode than the third radiating element.

7. The antenna module according to claim 6, further comprising:

a fourth radiating element that can radiate a radio wave in a fourth frequency band, the fourth frequency band being lower than the first frequency band, wherein the fourth radiating element overlaps with the first radiating element in plan view in the normal direction of the dielectric substrate.

8. The antenna module according to claim 7, wherein the dielectric constant of the first dielectric layer is higher than the dielectric constant of the second dielectric layer.

9. The antenna module according to claim 8, wherein the first dielectric layer is thicker than the second dielectric layer.

10. The antenna module according to claim 9, wherein each of the first radiating element, the second radiating element, and the third radiating element is configured to be able to radiate radio waves in two different polarization directions.

11. The antenna module according to claim 10, wherein a radio frequency signal is supplied to a first feed point and a second feed point in each of the first radiating element, the second radiating element, and the third radiating element, the first feed point is arranged on a position offset in a first direction from a center of a corresponding radiating element, and the second feed point is arranged on a position offset in a second direction from a center of a corresponding radiating element, the second direction being different from the first direction.

12. An antenna module comprising:

a dielectric substrate that has a first surface and a second surface;

a first radiating element, a second radiating element, and a third radiating element that are arranged in the dielectric substrate and each of which includes a plurality of electrodes having a flat-plate shape;

a first dielectric layer that is arranged on the first surface in a manner to cover a first region in which the electrodes of the first radiating element are arranged; and a second dielectric layer that is arranged on the first surface in a manner to cover a second region in which the electrodes of the third radiating element are arranged, wherein the first radiating element, the second radiating element, and the third radiating element can radiate radio waves in mutually-different frequency bands, the first region and the second region are adjacent to each other, a dielectric constant of the first dielectric layer and a dielectric constant of the second dielectric layer are higher than a dielectric constant of the dielectric substrate, the first radiating element can radiate a radio wave in a first frequency band, the second radiating element can radiate a radio wave in a second frequency band, the second frequency band being higher than the first frequency band, the third radiating element can radiate a radio wave in a third frequency band, the third frequency band being higher than the second frequency band, and the electrodes of the second radiating element overlap with the electrodes of the third radiating element in plan view in a normal direction of the dielectric substrate.

13. The antenna module according to claim 12, further comprising:

a feed device that supplies a radio frequency signal to each radiating element.

14. A communication device on which the antenna module according to claim 13 is mounted.

15. The antenna module according to claim 3, further comprising:

a fourth radiating element that can radiate a radio wave in a fourth frequency band, the fourth frequency band being lower than the first frequency band, wherein the fourth radiating element overlaps with the first radiating element in plan view in the normal direction of the dielectric substrate.

16. The antenna module according to claim 1, wherein the dielectric constant of the first dielectric layer is higher than the dielectric constant of the second dielectric layer.

17. The antenna module according to claim 1, wherein the first dielectric layer is thicker than the second dielectric layer.

18. The antenna module according to claim 1, wherein each of the first radiating element, the second radiating element, and the third radiating element is configured to be able to radiate radio waves in two different polarization directions.

19. The antenna module according to claim 1, wherein a radio frequency signal is supplied to a first feed point and a second feed point in each of the first radiating element, the second radiating element, and the third radiating element, the first feed point is arranged on a position offset in a first direction from a center of a corresponding radiating element, and the second feed point is arranged on a position offset in a second direction from a center of a corresponding radiating element, the second direction being different from the first direction.

20. The antenna module according to claim 1, further comprising:

a feed device that supplies a radio frequency signal to each radiating element.

* * * * *